Jan. 15, 1946. A. ROBERTSON 2,393,063
CLIP FOR WIRES OR CONDUITS
Filed May 2, 1944
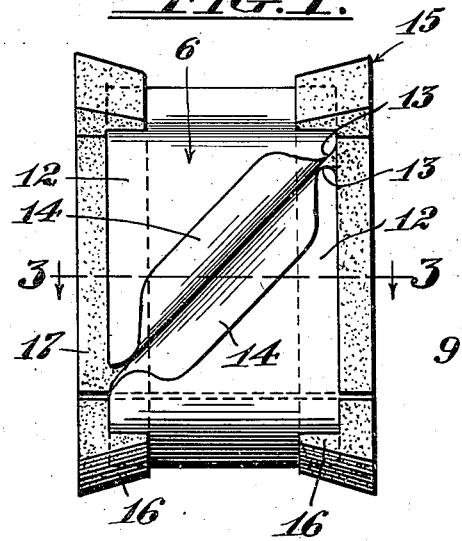
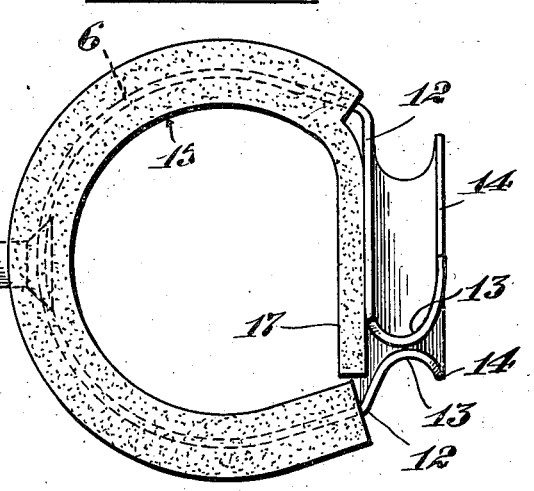
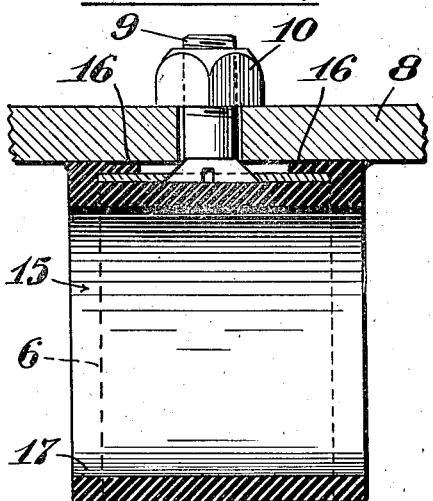
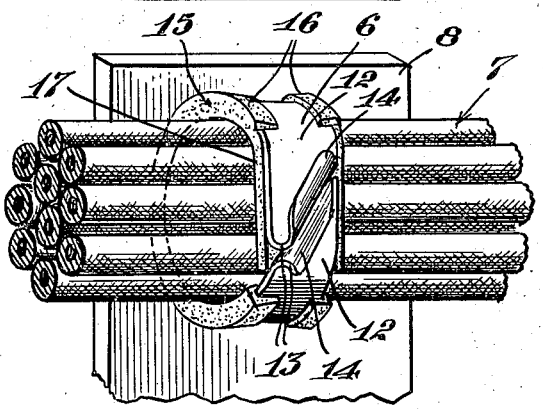
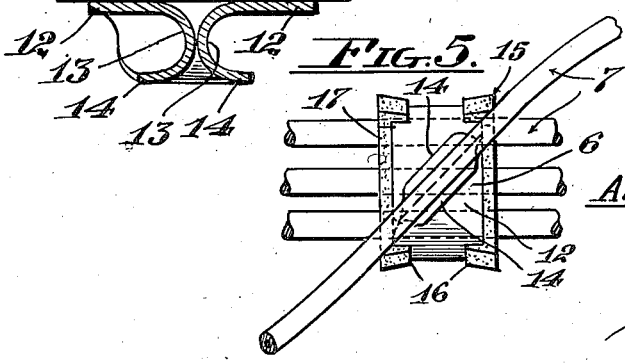
Inventor
Archibald Robertson;
By
R. S. Berry
Attorney Patented Jan. 15, 1946

2,393,063

UNITED STATES PATENT OFFICE 2,393,063

CLIP FOR WIRES OR CONDUITS

Archibald Robertson, Hollywood, Calif., assignor to Adel Precision Products Corp., a corporation of California Application May 2, 1944, Serial No. 533,771

5 Claims. (Cl. 248—74)

This invention relates to spring clips of the type shown in my pending application for United States Letters Patent, Ser. No. 502,340, filed September 14, 1943, for supporting in a particular manner a group or bundle of wires or a conduit line, in aircraft or the like.

An object of my invention is to provide a clip of the character described in the form of a split or open, spring metal band or loop having abutting free ends normally in tensioned contact with one another and so constructed and arranged that when a wire, or a group of wires or a conduit line is forcibly pressed between and against said ends, or when the clip moved in a certain manner to press the ends against the wire, or wires, or the conduit line, the ends will readily spread apart so that the wire, wires or conduit line will then readily enter the clip, after which the ends will spring back into tensioned contact with one another and due to the shape and arrangement thereof, will effectively prevent accidental or unintentional removal of the wires or conduit, which however, may be removed when intentionally brought into a certain position relative to said ends and then forcibly pulled therebetween.

Another object of my invention is to provide a clip for the purpose described in which a spring metal band is split in such manner that the wires or conduit held therein will intersect the split rather than extend parallel thereto, as by means of a diagonal split, whereby the ends of the band in being thus formed and abutting one another under tension will prevent accidental dislodgement or removal of the wires or conduit held therein but when the wires or conduit and said diagonal ends are brought in substantial parallelism the insertion and removal of the wires or conduit may be readily effected.

Another object is to provide a clip such as described in which the diagonal abutting ends thereof are rounded and outwardly flared to provide a "mouth" facilitating the insertion and removal of the wires or conduit.

Another object is to provide a clip such as described in which the split loop or band thereof is constructed to be fastened to a support intermediate the ends formed by the split, so that the wires or conduit may be inserted and removed after the clip is fastened to the support.

A further object of my invention is to provide a split spring clip such as described which readily lends itself to the application of a cushioning strip thereto with a flap portion of the strip lying between the split and the wires, to further resist accidental removal of the wire or conduit therefrom, the said flap portion of the cushion being movable relative to the cushion proper and ends of the clip to permit of insertion and removal of the wires on a conduit.

With the foregoing objects in view together with such other objects and advantages as may subsequently appear, the invention is carried into effect as illustrated by way of example in the accompanying drawing in which:

Fig. 1 is a front elevation of a clip embodying my invention;

Fig. 2 is a side elevation thereof;

Fig. 3 is a horizontal sectional view taken on the line 3—3 of Fig. 1, and showing the clip fastened to a support;

Fig. 4 is a perspective view of the clip as completely installed to support a bundle of wires;

Fig. 5 is a front elevation of the clip showing how a wire and the diagonal ends are brought into substantial parallelism to effect an easy insertion or removal thereof.

Referring more specifically to the drawing it will be apparent that one form of clip embodying my invention generally includes a split spring metal band 6 which is adapted to embrace and support a group of wires 7 on a support 8 to which latter the clip is secured by means of a bolt 9 and nut 10. A bolt receiving opening is provided in the band 6 intermediate the ends thereof to receive said bolt which supports the band in such a position that said ends, although having tensioned contact with one another may be spread apart to facilitate insertion and removal of the wires in a particular manner which will be hereinafter fully described.

In accordance with my invention the split of the band 6 is such that the wires held in the band extend across the split instead of parallel thereto, thereby preventing accidental removal of the wires and making it necessary to bring the wires and split in substantial parallelism as shown in Fig. 5 to effect a ready insertion or removal of the wires.

Moreover the ends of the band are so formed that on pressing the wires against the split when in substantial parallelism therewith, the wires may be readily inserted and removed.

As here shown the split is diagonal and defines opposed somewhat pointed end portions 12—12, provided with diagonally extending outward curved or rounded portions 13—13 which abut one another under tension and are further outwardly extended and flared to form divergent and rounded lips 14—14, also extending diagonally across the band like the split, and the abutting portions 13.

While the diagonal split here shown constitutes one way of carrying out this invention it is to be understood that any other split formation which will provide abutting end edges of the band which are disposed out of parallelism with the wires or conduit to prevent or effectively resist accidental removal of the wires, is within the purview and concept hereof.

It will now be seen that when the wires are brought into substantial parallelism with the split, that is, the abutting portions 13 and lips 14, and pressed against said lips, as shown in Fig. 5, they may be easily inserted into the clip. In similar manner the wires may be removed, it only being necessary to bring the wires and split in parallelism to effect an easy removal of the wires from the clip.

When a bundle of wires has been mounted in the clip, the portions 13 of the ends 12 are held in tensioned contact by the spring action of the band and the wires intersect or extend across the split or in other words, the split extends diagonally and out of parallelism with the wires so that accidental removal or withdrawal of the wires is effectively prevented. In inserting the wires the flared lips 14 serve as a guide and retaining mouth making for a quick and easy insertion. The lip portions of the abutting ends produce a groove with side portions which guide the entrant movement of the wire into the band. Likewise a similar mouth is provided interiorally of the contacting outwardly curved portions 13, to facilitate holding the wires in parallelism therewith to effect withdrawal of the wires from the clip.

While the clip hereof may, if desired, be effectively used without a cushion strip as a lining for the band 6, I prefer to use as here shown a cushion strip 15 of elastic yieldable material such as rubber or the like having rebent flanges 16 to hold the strip on the band 6. The ends of the cushion terminate short of and leave bare the major portions of the pointed ends 12, except that a flap extension 17 of the cushion lies on the inner surfaces of the band so as to overlie or extend across the slit and abutting portions 13 of the ends 12. In other words the unflanged flap extension 17 directly underlies the abutting ends 12 thereby closing the slit from end to end and preventing the accidental withdrawal of the wires therethrough. However, the flap 17 is freely movable relative to the cushion 15 proper and the ends 12 whereby it may be pushed aside by the wires being inserted, and will then spring back in place. It is also pushed aside to bring the wires in parallelism to the slit, when removing the wires from the clip. The extension 17 makes a 360 degree cushion, completely encircling the wires, thereby more effectively cushioning and protecting the wires as well as holding them in place in the clip.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting wires or a conduit, a spring metal split band for embracing and supporting the wires or conduit; and end portions on the band defined by said slit so that they abut one another under tension and extend diagonally across the band to effectively maintain the band closed around a bundle of wires or a conduit mounted in said band.

2. In a clip for supporting wires or a conduit, a spring metal split band for embracing and supporting the wires or conduit; and end portions on the band defined by said slit so that they abut one another under tension and extend diagonally across the band to effectively maintain the band closed around a bundle of wires or a conduit mounted in said band, a cushion strip lining said band, and a flap portion extending as a continuation of said cushion and across said abutting end portions and inwardly thereof to lie between the wires and said end portions, the free end portion of said flap being rectangular and directly underlying and closing all parts of the slit when the ends of the clip abut each other.

3. In a clip for supporting wires or a conduit, a spring metal split band for embracing and supporting the wires or conduit, and end portions on said band normally disposed by the spring action of the band in tensioned contact with one another and subject to being forced apart to insert or remove the wires or conduits, said end portions having their abutting faces out of parallelism with the portions of the wires or conduits extending through the band whereby the wires or conduits are subject to insertion or removal when moved between said abutting end portions while substantially parallel therewith.

4. In a clip for supporting wires or a conduit, a spring metal split band for embracing and supporting the wires or conduit, and end portions on said band normally disposed by the spring action of the band in tensioned contact with one another and subject to being forced apart to insert or remove the wires or conduits, said end portions having their abutting faces out of parallelism with the portions of the wires or conduits extending through the band whereby the wires or conduits are subject to insertion or removal when moved between said abutting end portions while substantially parallel therewith, and a cushion strip lining said band, said strip having flanged side portions gripping the band and having an unflanged terminal flap portion extending between the wires or conduits in the band and said abutting end portions, the free end portion of said flap being rectangular and directly underlying and closing all parts of said slit when the ends of the clip abut each other.

5. In a clip for supporting wires, a spring metal split band for embracing and supporting the wires; and end portions on the band defined by the split so that they abut one another under tension and extend across the band normally to maintain the band closed around a bundle of wires, and a cushion strip carried by said band and having a flap extending across the split of the band interiorly thereof, said flap directly underlying and contacting with said split to prevent accidental opening of the band at the split by pressure of the wires, said flap being deflectable to allow wires to be fed across the extremity thereof and into and out of the split.

ARCHIBALD ROBERTSON.